US012124381B2

(12) United States Patent
Pang

(10) Patent No.: US 12,124,381 B2
(45) Date of Patent: Oct. 22, 2024

(54) HARDWARE TRANSLATION REQUEST RETRY MECHANISM

(71) Applicant: ATI TECHNOLOGIES ULC, Markham (CA)

(72) Inventor: Edwin Pang, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/529,499

(22) Filed: Nov. 18, 2021

(65) Prior Publication Data
US 2023/0153249 A1 May 18, 2023

(51) Int. Cl.
*G06F 12/10* (2016.01)
*G06F 12/1027* (2016.01)
*G06F 8/41* (2018.01)

(52) U.S. Cl.
CPC ............ *G06F 12/1027* (2013.01); *G06F 8/44* (2013.01); *G06F 2212/651* (2013.01); *G06F 2212/68* (2013.01)

(58) Field of Classification Search
CPC ............. G06F 12/1027; G06F 2212/68; G06F 2212/651; G06F 8/44; G06F 9/44505; G06F 2212/1008; G06F 2212/1024; G06F 2212/1032; G06F 2212/681; G06F 2212/683; G06F 2212/684
USPC ......................................................... 711/207
See application file for complete search history.

(56) References Cited

U.S. PATENT DOCUMENTS

| 2011/0107057 | A1* | 5/2011 | Petolino, Jr. | ........ G06F 12/1027 711/207 |
| 2019/0018796 | A1* | 1/2019 | Jaspers | ............... G06F 12/1027 |
| 2019/0065400 | A1* | 2/2019 | Shaji Lal | ............ G06F 12/1054 |
| 2022/0206956 | A1* | 6/2022 | Hodge | ................ H04L 47/2441 |

* cited by examiner

*Primary Examiner* — Hua J Song

(57) ABSTRACT

A processing system includes a hardware translation lookaside buffer (TLB) retry loop that retries virtual memory address to physical memory address translation requests from a software client independent of a command from the software client. In response to a retry response notification at the TLB, a controller of the TLB waits for a programmable delay period and then retries the request without involvement from the software client. After a retry results in a hit at the TLB, the controller notifies the software client of the hit. Alternatively, if a retry results in an error at the TLB, the controller notifies the software client of the error and the software client initiates error handling.

20 Claims, 5 Drawing Sheets

HARDWARE TRANSLATION REQUEST RETRY MECHANISM

BACKGROUND

Processing systems often use virtual memory for handling data accesses by executing programs (e.g., applications, operating systems, device drivers, etc.). In such a processing system, programs access memory using "virtual addresses" in "virtual address spaces," which are local address spaces that are specific to corresponding programs, instead of accessing memory using addresses based on the physical locations (or "physical addresses") of blocks of memory (or "pages"). Thus, to support memory accesses, the processing system typically employs address translation circuitry to translate the virtual addresses to corresponding physical addresses. The address translation circuitry employs one or more translation lookaside buffers (TLBs) to cache virtual-to-physical address translations for efficient lookup by processor cores.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
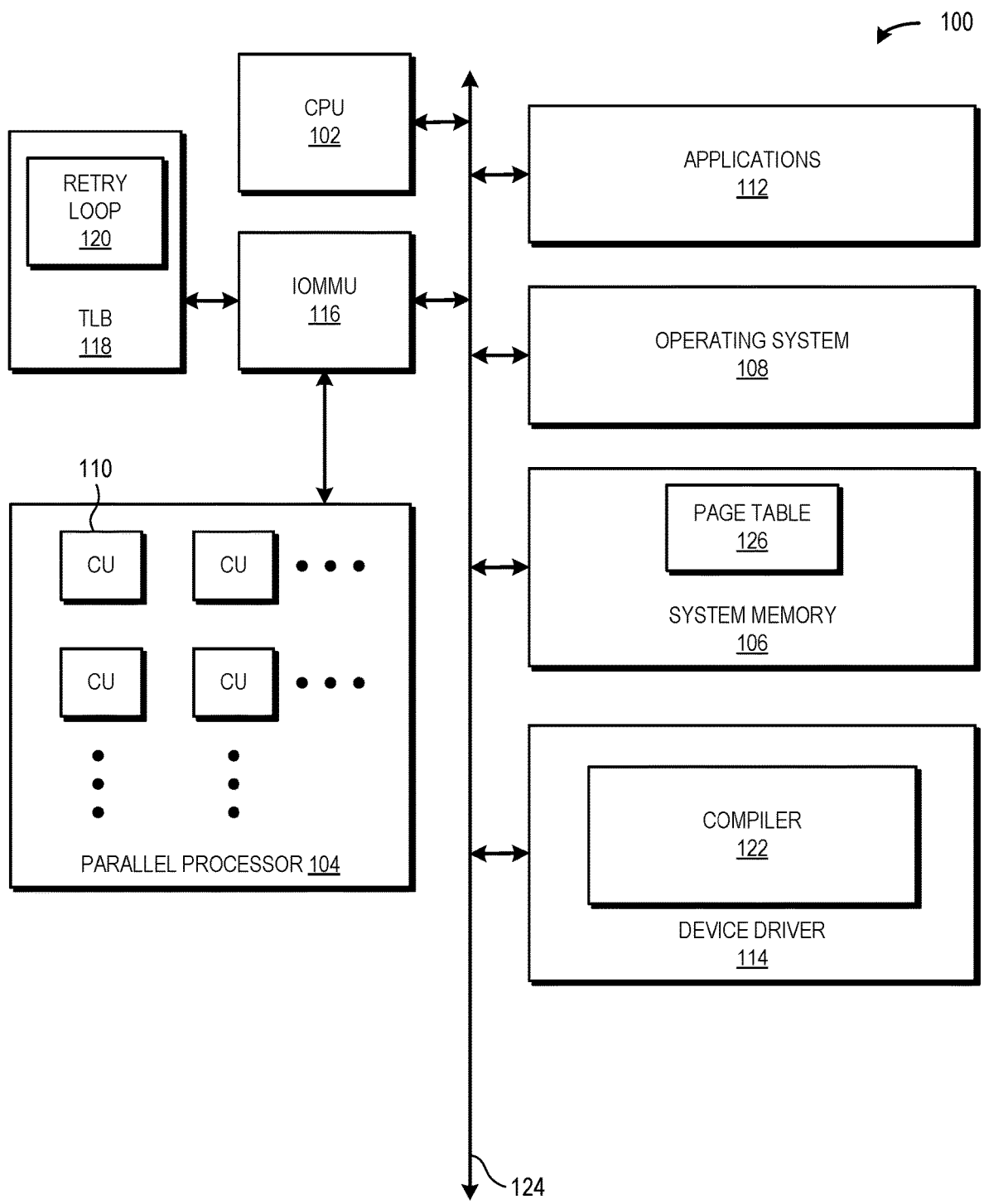
FIG. 1 is a block diagram of a processing system including a hardware TLB retry loop in accordance with some embodiments.

Processor cores in the processing system keep track of the physical locations of the pages for the programs so that programs are not required to keep track of the physical locations of pages in memory. Programs access memory using virtual addresses in virtual address spaces, which are local address spaces that are specific to corresponding programs, instead of accessing memory using addresses based on the physical addresses of pages. As part of managing the physical locations of pages, the processors translate the virtual addresses used by the programs in memory access requests into the physical addresses where the data is actually located. The processors then use the physical addresses to perform the memory accesses for the programs.

In order to enable the virtual address to physical address translation, the processing system includes a page table, which is a record stored in a memory of the processing system that includes entries, referred to as "page table entries," with virtual address to physical address translation information for pages of data that are stored in the system memory. Upon receiving a request from a program to access memory at a given virtual address, a processor acquires corresponding physical address information from the page table by performing a page table walk, during which the page table is searched, in some cases entry-by-entry, for a page table entry that provides the physical address associated with the virtual address.

Because page table walks are relatively slow, the processing system includes TLBs, which are local caches in each processor that are used by the processor core for storing a limited number of copies of page table entries acquired during page table walks (or information based on page table entries). During operation, processor cores first attempt to acquire cached page table entries from the corresponding TLB for performing virtual address to physical address translations. When the copy of the corresponding page table entry is not present in the TLB (i.e., when a "miss" occurs), the processor cores perform a page table walk to acquire the desired page table entry—and cache a copy of the acquired page table entry in the TLB.

The processing system utilizes page migration to take advantage of spatial locality between source and destination memory locations in the processing system. Page migration refers to the transferring of a page from a source memory location to a destination memory location that is closer in proximity to the processor that executes processes that utilize the pages stored in the destination memory location. Using page migration allows the processing system to reduce the amount of time taken to access pages in memory.

Page migration results in processor cores in the processing system modifying page table entries in the page table (e.g., changing virtual address to physical address translation information for the page table entries, changing a read/write property for page table entries, etc.). In order to avoid inconsistencies between the page table and copies of page table entries held in TLBs in other processors in the computing device, a processor core that initiated the modification of the page table entry (or an "initiating processor") performs an operation called a "TLB shootdown." Generally, during a TLB shootdown, a processor core that is to modify a page table entry sends an indication (referred to herein as a "shootdown request") that entries of a TLB corresponding to the page table entry are to be invalidated, causing other processor cores that may hold a cached copy of the page table entry to invalidate the cached copy, thereby avoiding the inconsistencies.

Typically, if a request from a program executing at the processing system (referred to herein as a software client) for an address translation results in a miss at the TLB, a controller for the TLB notifies the software client of the miss, and the software client initiates a retry loop. In the retry loop, the software client re-sends the request to the TLB, waits for a notification (ACK) of a hit or a miss, retries again in response to a miss, waits for ACK, etc. until the desired page table entry is present in the TLB and the request results in a hit. However, executing the retry loop at the software client degrades performance of the processing system, as the software client is prevented from executing additional tasks as it retries and waits for ACK until the request results in a hit.

To improve processing efficiency, particularly during page migration, the processing system includes a hardware TLB retry loop that retries translation requests from a software client independent of a command from the software client. In response to a miss at the TLB, a controller of the TLB waits for a programmable delay period and then retries the request without involvement from the software client. If another request is received at the TLB while the retry is in progress, in some embodiments the controller blocks the second request until the retry has completed. After a retry results in a hit at the TLB, the controller notifies the software client of the hit. Alternatively, if a retry results in an error at the TLB, the controller notifies the software client of the error and the software client initiates error handling.

In some embodiments, the programmable delay period is implemented at a timer or a counter and is programmed at initialization of the software client. For example, in some embodiments, the counter adjusts a delay period between retry attempts and is programmed in the software client's register block. When a miss occurs, the timer increments, and the controller compares the timer to the register value. When the timer matches the register value, the controller generates a retry request.

In some embodiments, requests (including retry requests and TLB shootdown requests) to the TLB are stored at a buffer such as a first-in-first-out (FIFO) queue. If a TLB shootdown request is placed in the FIFO queue, the TLB controller employs a bypass mechanism to allow the TLB shootdown request to bypass any requests (including retry requests) that precede the TLB shootdown request in the FIFO queue. Once the entries indicated by the TLB shootdown request have been invalidated, the controller sends an acknowledgement to the software client that requested the TLB shootdown. The TLB controller then processes the requests that were bypassed by the TLB shootdown request. By allowing the TLB shootdown request to bypass other requests in the FIFO queue, the controller prevents stale translations from being returned to the software client.

FIG. 1 illustrates a processing system configured to execute a command indicating an operating state of a component of the processing system during execution of a workload in accordance with some embodiments. The processing system 100 includes a central processing unit (CPU) 102 and a parallel processing unit (PPU) 104, also referred to herein as parallel processor 104. In various embodiments, the CPU 102 includes one or more single- or multi-core CPUs. In various embodiments, the parallel processor 104 includes any cooperating collection of hardware and/or software that perform functions and computations associated with accelerating graphics processing tasks, data parallel tasks, nested data parallel tasks in an accelerated manner with respect to resources such as conventional CPUs, conventional graphics processing units (GPUs), and combinations thereof. In the embodiment of FIG. 1, the processing system 100 is formed on a single silicon die or package that combines the CPU 102 and the parallel processor 104 to provide a unified programming and execution environment. This environment enables the parallel processor 104 to be used as fluidly as the CPU 102 for some programming tasks. In other embodiments, the CPU 102 and the parallel processor 104 are formed separately and mounted on the same or different substrates. It should be appreciated that processing system 100 may include one or more software, hardware, and firmware components in addition to or different from those shown in FIG. 1. For example, processing system 100 may additionally include one or more input interfaces, non-volatile storage, one or more output interfaces, network interfaces, and one or more displays or display interfaces.

As illustrated in FIG. 1, the processing system 100 also includes a system memory 106, an operating system 108, a communications infrastructure 124, and one or more applications 112. Access to system memory 106 is managed by a memory controller (not shown), which is coupled to system memory 106. For example, requests from the CPU 102 or other devices for reading from or for writing to system memory 106 are managed by the memory controller. In some embodiments, the one or more applications 112 include various programs or commands to perform computations that are also executed at the CPU 102. The CPU 102 sends selected commands for processing at the parallel processor 104. The operating system 108 and the communications infrastructure 124 are discussed in greater detail below. The processing system 100 further includes a device driver 114 and a memory management unit, such as an input/output memory management unit (IOMMU) 116. Components of processing system 100 may be implemented as hardware, firmware, software, or any combination thereof. In some embodiments the processing system 100 includes one or more software, hardware, and firmware components in addition to or different from those shown in FIG. 1.

Within the processing system 100, the system memory 106 includes non-persistent memory, such as DRAM (not shown). In various embodiments, the system memory 106 stores processing logic instructions, constant values, variable values during execution of portions of applications or other processing logic, or other desired information. For example, in various embodiments, parts of control logic to perform one or more operations on CPU 102 reside within system memory 106 during execution of the respective portions of the operation by CPU 102. During execution, respective applications, operating system functions, processing logic commands, and system software reside in system memory 106. Control logic commands that are fundamental to operating system 108 generally reside in system memory 106 during execution. In some embodiments, other software commands (e.g., device driver 114) also reside in system memory 106 during execution of processing system 100.

The system memory 106 includes a page table 126, which maintains a record of page table entries storing virtual address to physical address translation information for pages of data that are stored in the system memory. Upon receiving a request from a program to access memory at a given virtual address, the CPU 102 or parallel processor 104 performs a page table walk to acquire corresponding physical address information from the page table 126 for a page table entry that provides the physical address associated with the virtual address.

The IOMMU 116 is a multi-context memory management unit. As used herein, context is considered the environment within which kernels execute and the domain in which synchronization and memory management is defined. The context includes a set of devices, the memory accessible to those devices, the corresponding memory properties, and one or more command-queues used to schedule execution of a kernel(s) or operations on memory objects. The IOMMU 116 includes logic to perform virtual to physical address translation for memory page access for devices, such as the parallel processor 104. In some embodiments, the IOMMU 116 also includes, or has access to, a translation lookaside buffer (TLB) 118. The TLB 118, as an example, is implemented in a content addressable memory (CAM) to accelerate translation of logical (i.e., virtual) memory addresses to physical memory addresses for requests made by the parallel processor 104 for data in system memory 106. The TLB 118 stores a subset of the virtual address to physical address information stored at the page table 126. In some embodiments, the TLB 118 is implemented as a hierarchy of multiple TLBs.

In various embodiments, the communications infrastructure 124 interconnects the components of processing system 100. Communications infrastructure 124 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some embodiments, communications infrastructure 124 also includes an Ethernet network or any other suitable physical communications infrastructure that satisfies an application's data transfer rate requirements. Communications infrastructure 124 also includes the functionality to interconnect components, including components of processing system 100.

A driver, such as device driver 114, communicates with a device (e.g., parallel processor 104) through an interconnect or the communications infrastructure 124. When a calling program invokes a routine in the device driver 114, the device driver 114 issues commands to the device. Once the device sends data back to the device driver 114, the device driver 114 invoke routines in an original calling program. In general, device drivers are hardware-dependent and operating-system-specific to provide interrupt handling required for any necessary asynchronous time-dependent hardware interface. In some embodiments, a compiler 122 is embedded within device driver 114. The compiler 122 compiles source code into program instructions as needed for execution by the processing system 100. During such compilation, the compiler 122 applies transforms to program instructions at various phases of compilation. In other embodiments, the compiler 122 is a stand-alone application. In various embodiments, the device driver 114 controls operation of the parallel processor 104 by, for example, providing an application programming interface (API) to software (e.g., applications 112) executing at the CPU 102 to access various functionality of the parallel processor 104.

The CPU 102 includes (not shown) one or more of a control processor, field programmable gate array (FPGA), application specific integrated circuit (ASIC), or digital signal processor (DSP). The CPU 102 executes at least a portion of the control logic that controls the operation of the processing system 100. For example, in various embodiments, the CPU 102 executes the operating system 108, the one or more applications 112, and the device driver 114. In some embodiments, the CPU 102 initiates and controls the execution of the one or more applications 112 by distributing the processing associated with one or more applications 112 across the CPU 102 and other processing resources, such as the parallel processor 104.

The parallel processor 104 executes commands and programs for selected functions, such as graphics operations and other operations that may be particularly suited for parallel processing. The parallel processor 104 is a processor that is able to execute a single instruction on a multiple data or threads in a parallel manner. Examples of parallel processors include processors such as graphics processing units (GPUs), massively parallel processors, single instruction multiple data (SIMD) architecture processors, and single instruction multiple thread (SIMT) architecture processors for performing graphics, machine intelligence or compute operations. In some implementations, parallel processors are separate devices that are included as part of a computer. In other implementations such as advance processor units, parallel processors are included in a single device along with a host processor such as a central processor unit (CPU). In general, parallel processor 104 is frequently used for executing graphics pipeline operations, such as pixel operations, geometric computations, and rendering an image to a display. In some embodiments, parallel processor 104 also executes compute processing operations (e.g., those operations unrelated to graphics such as video operations, physics simulations, computational fluid dynamics, etc.), based on commands received from the CPU 102. A command can be executed by a special processor, such a dispatch processor, command processor, or network controller.

In various embodiments, the parallel processor 104 includes one or more compute units 110 that are processor cores that include one or more SIMD units (not shown) that execute a thread concurrently with execution of other threads in a wavefront, e.g., according to a single-instruction, multiple-data (SIMD) execution model. The SIMD execution model is one in which multiple processing elements such as arithmetic logic units (ALUs) share a single program control flow unit and program counter and thus execute the same program but are able to execute that program with different data. Some embodiments of the parallel processor 104 are used to implement a GPU and, in that case, the compute units 110 are referred to as shader cores or streaming multi-processors (SMXs). The number of compute units 110 that are implemented in the parallel processor 104 is a matter of design choice. An application 112 executing at one or more of the compute units 110 is referred to as a software client.

In the event the TLB 118 experiences a delay in retrieving a requested page, e.g., during page migration, the TLB 118 returns a retry response notification (referred to herein as a "retry response ACK"). For example, in embodiments in which the TLB 118 is implemented as a hierarchy of multiple TLBs, a lower level TLB may need a longer than usual time to retrieve a page during page migration. In such cases, the lower level TLB returns a retry response ACK to the higher level TLB. To facilitate retries of translation requests from software clients that result in retry response ACKs at the TLB 118, the TLB 118 includes a hardware TLB retry loop 120. The hardware TLB retry loop 120 is implemented as circuitry that retries translation requests from a software client independent of a command from the software client. In response to a retry ACK at the TLB 118, a controller (not shown) of the TLB 118 waits for a programmable delay period. Upon expiration of the programmable delay period, the hardware TLB retry loop 120 retries the translation request without involvement from the software client. In some embodiments, if an incoming request is received at the TLB 118 while the retry is in progress, the controller blocks the incoming request until the retry has completed. After a retry attempt results in a hit at the TLB 118, the controller notifies the software client of the hit. If a retry results in an error at the TLB 118, such as, for example, in the event the requested page is not mapped in the page table 126, the TLB 118 returns an error to the software client. In embodiments in which the TLB 118 is implemented as a hierarchy of multiple TLBs, a lower level TLB returns the error to a higher level TLB, which in turn returns the error to the software client. The software client initiates error handling in response to receiving the error.

In some embodiments, the hardware TLB retry loop 120 implements a timer (not shown) that is programmed at initialization of the software client. When a retry response ACK is received, the timer increments, and the controller compares the timer to a register value programmed in the client's register block. When the timer matches the register value, the controller generates a retry request.

In some embodiments, translation retry requests, incoming translation requests, and TLB shootdown requests to the TLB 118 are stored at a FIFO queue (not shown). The controller accesses the FIFO queue and pops the first request to perform the requested translation or shootdown. In some embodiments, if the FIFO queue includes a TLB shootdown request, the controller allows the TLB shootdown request to bypass any requests that precede the TLB shootdown request in the FIFO queue. The controller performs the TLB shootdown by invalidating the entries indicated by the TLB shootdown request. Once the entries indicated by the TLB shootdown request have been invalidated, the controller sends an acknowledgement to the software client that requested the TLB shootdown. The TLB controller then processes the requests that were bypassed by the TLB shootdown request. By allowing the TLB shootdown request to bypass other requests in the FIFO queue, the controller prevents stale translations from being returned to the software client.

Figure 2:
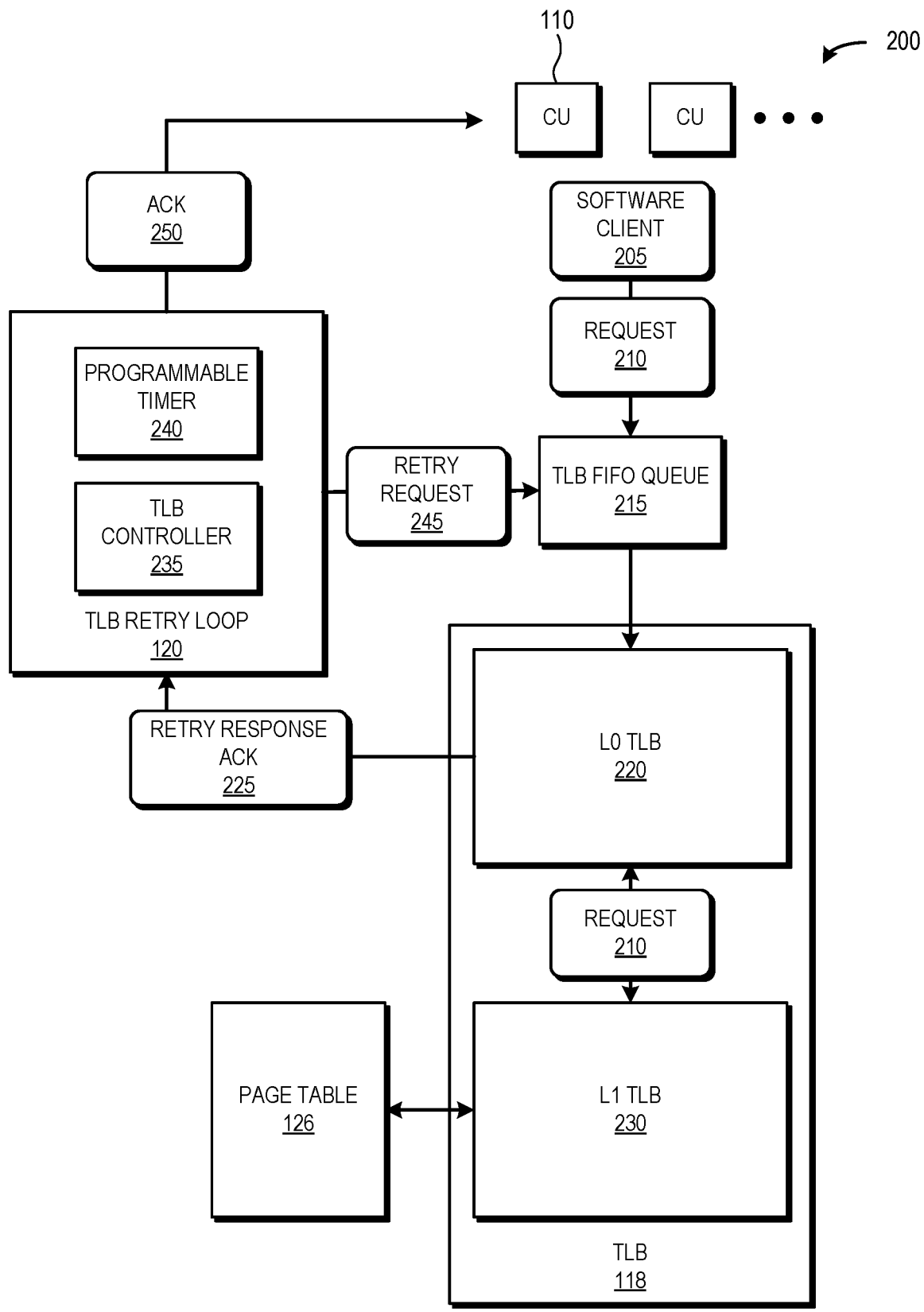
FIG. 2 is a block diagram of the hardware TLB retry loop in accordance with some embodiments.

FIG. 2 is a block diagram of a portion 200 of the processing system 100 of FIG. 1 illustrating the hardware TLB retry loop 120 in accordance with some embodiments. The hardware TLB retry loop 120 includes a TLB controller 235 and a programmable timer 240. In the illustrated example, the TLB 118 includes a hierarchy of two address translation caches, L0 TLB 220 and L1 TLB 230, to maintain subsets of virtual address to physical address translations stored at the page table 126.

In response to an address translation request 210 from a software client 205, the TLB controller 235 reviews the translations stored at the L0 TLB 220 to determine if any of the entries stores a translation for the virtual memory address indicated by the translation request 210. If so, the TLB controller 235 indicates a hit and satisfies the translation request 210 by providing the translation to the software client 205. If the request 210 results in a retry response ACK 225, the retry response handled by the hardware TLB retry loop 120. If a translation associated with the virtual memory address is not stored at an entry of the L0 TLB 220, the TLB controller 235 indicates a miss (not shown) and issues the request 210 to the L1 TLB 230. While the request 210 is pending at the TLB 118, in some embodiments, the miss is handled by the hardware TLB retry loop 120.

If any of the entries of the L1 TLB 230 stores a translation associated with the virtual memory address targeted by the translation request 210, the TLB controller 235 indicates a hit and provides the translation to the L0 TLB 220. If the translation associated with the virtual memory address indicated by the translation request 210 is not stored in an entry of the L1 TLB 230, the TLB controller 235 issues the translation request 210 to the page table 126 for the translation. Upon receipt of the translation from the page table 126, the TLB controller 235 stores the translation at an entry of the L1 TLB 230, from which it is subsequently transferred to the L0 TLB 220.

During the time that the translation request 210 is pending at the TLB 118, and in response to the retry response ACK 255, the hardware TLB retry loop 120 initiates a retry mechanism independent of the software client 205. In some embodiments, the hardware TLB retry loop 120 waits for a programmable delay period in response to the retry response ACK 225 at the TLB 118. For example, in some embodiments, the programmable timer 240 starts in response to the retry response ACK 225. When the programmable timer 240 reaches a predetermined threshold, the hardware TLB retry loop 120 issues a retry request 245 to the TLB FIFO queue 215. In some embodiments, if an incoming request is received at the TLB FIFO queue 215 while the retry request 245 is in progress, the TLB controller 235 blocks the incoming request until the retry request 245 has completed.

Upon the retry request 245 reaching the top of the TLB FIFO queue 215, the TLB controller 235 determines if any of the entries of the L0 TLB 220 stores a translation associated with the virtual memory address targeted by the retry request 245. Depending on the timing of the retry request 245 and how long it takes to retrieve the translation to the L0 TLB 220 (from either the L1 TLB 230 or, if the translation is not stored at the L1 TLB 230, from the page table 126 to the L1 TLB 230 to the L1 TLB 220), the retry request 245 results in either a hit or a miss at the L0 TLB 220. If the predetermined threshold for the programmable timer 240 is set for a relatively short time, it is less likely that the translation will have been retrieved to the L0 TLB 220 by the time the retry request 245 is issued to the L0 TLB 220, and accordingly more likely that the retry request 245 will result in a miss or another retry response ACK 255. Conversely, if the predetermined threshold for the programmable timer 240 is set of a relatively long time, it is more likely that the translation will have been retrieved to the L0 TLB 220 by the time the retry request 245 is issued to the L0 TLB 220, and accordingly more likely that the retry request 245 will result in a hit. However, if the predetermined threshold for the programmable timer 240 is set for a long time, latency may be adversely affected. If the translation is stored at an entry of the L0 TLB 220 when the retry request 245 is in progress, the retry request 245 results in a hit. If the translation is not stored at an entry of the L0 TLB 220 when the retry request 245 is in progress, the retry request 245 results in another retry response ACK 225 or a miss that reenters the hardware TLB retry loop 120.

After a retry attempt results in a hit at the TLB 118, the TLB controller 235 notifies the software client 205 of the hit by sending a notification such as an ACK 250. If a retry results in an error at the TLB 118, the TLB controller 235 notifies the software client 205 of the error and the software client 205 initiates error handling. Thus, hardware TLB retry loop 120 retries the translation request 210 at the TLB 118 independent of the software client 205 and notifies the software client 205 of a TLB hit or error once the retry request 245 has completed.

Figure 3:
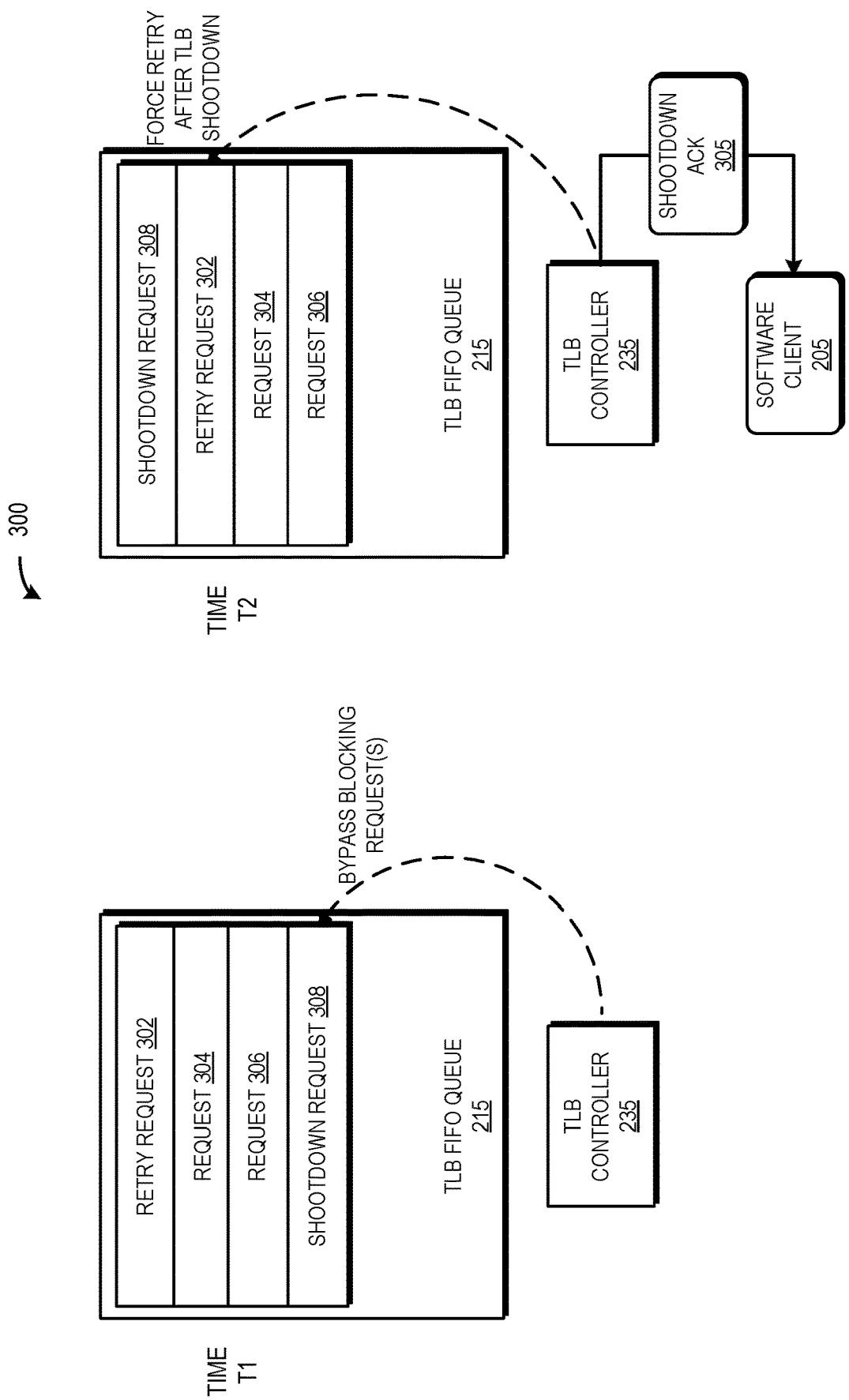
FIG. 3 is a block diagram of a TLB shootdown request bypassing TLB retry requests in accordance with some embodiments.

FIG. 3 is a block diagram 300 of a TLB shootdown request 308 bypassing other TLB translation requests 302, 304, 306 in accordance with some embodiments. At a time T1, the TLB FIFO queue 215 holds four pending requests: retry request 302, incoming translation request 304, incoming translation request 306, and shootdown request 308. The pending requests are stored in the order in which they were received, with retry request 302 having been received first, translation request 304 having been received second, translation request 306 having been received third, and shootdown request 308 having been received last. Typically, requests in the TLB FIFO queue 215 are processed in the order in which they were received. However, to prevent the translation requests 302, 304, 306 from accessing stale translations at the TLB 118, the TLB controller 235 allows the shootdown request 308 to bypass the translation requests 302, 304, 306 that are blocking the shootdown request 308 and be processed out of order at the TLB 118.

Accordingly, at a time T2, the TLB controller 235 has re-ordered the pending requests to store the shootdown request 308 at the top of the TLB FIFO queue 215, such that the shootdown request 308 will be processed first. After the shootdown request 308 completes and the entries of the TLB 118 indicated by the shootdown request 308 have been invalidated, the TLB controller 235 notifies the software client 205 that the shootdown request 308 has been completed, e.g., by sending a shootdown ACK 305.

After the shootdown request 308 has completed, the TLB controller 235 forces a retry of the pending requests 302, 304, 306 that were bypassed by the shootdown request 308.

When the retry request 302, translation request 304 and translation request 306 are processed by the TLB controller 235, they will access current virtual memory address to physical memory address translations. In some embodiments, the TLB controller 235 treats the translation requests 304, 306 as retry requests after they are bypassed by the shootdown request 308. During the force retry, in some embodiments, if the translation requests 304, 306 request translations of memory addresses that are stored at the same cache line, the TLB controller 235 sends a force retry request for only one of translation request 304 and translation request 306.

Figure 4:
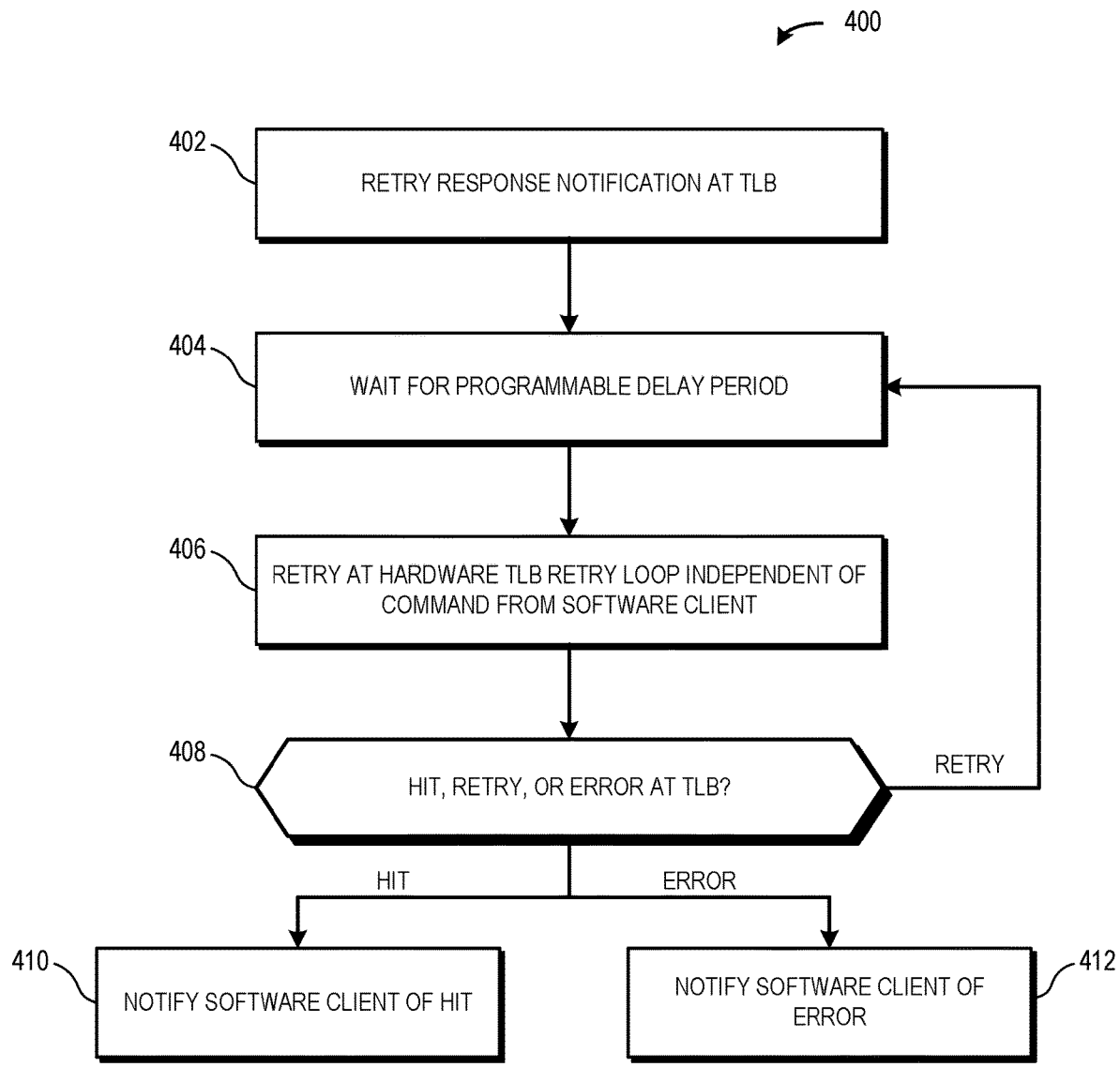
FIG. 4 is a flow diagram illustrating a method of retrying a TLB request in hardware in accordance with some embodiments.

FIG. 4 is a flow diagram illustrating a method 400 of retrying a TLB request at a hardware TLB retry loop 120 in accordance with some embodiments. Method 400 is implemented in a processing system such as the processing system 100 of FIG. 1. In some embodiments, method 400 is initiated by one or more processors in response to one or more instructions stored by a computer-readable storage medium.

At block 402, a translation request 210 from a software client 205 results in a retry response ACK 225 at the TLB 118. While the requested translation is being retrieved from the L1 TLB 230 and/or the page table 126 to the L0 TLB 220, at block 404, the retry response ACK 225 is sent to the hardware TLB retry loop 120. At the hardware TLB retry loop 120, the TLB controller 235 waits for a programmable delay period based on a programmable timer 240. In some embodiments, the programmable timer 240 starts in response to the retry response ACK 225. When the programmable timer 240 reaches a predetermined threshold, the hardware TLB retry loop 120 issues a retry request 245 to the TLB FIFO queue 215. In some embodiments, the predetermined threshold is a value that is programmed in the register block of the software client 205.

When the programmable delay period has passed, the method flow continues to block 406. At block 406, the hardware TLB retry loop 120 sends a retry request 245 to the TLB FIFO queue 215 independent of a command from the software client 205. When the retry request 245 reaches the top of the TLB FIFO queue 215, at block 408, the TLB controller 235 determines if any of the entries of the L0 TLB 220 stores a translation associated with the virtual memory address targeted by the retry request 245.

If, at block 408, the TLB controller 235 determines that there is a hit at the TLB 118 (e.g., that the L0 TLB 220 stores a translation of the virtual address indicated by the retry request 245), the method flow continues to block 410. At block 410, the TLB controller 235 notifies the software client 205 of the hit, e.g., by sending an ACK 250 to the software client 205. If, at block 408, the TLB controller 235 determines that there is a miss or another retry response ACK 255 at the TLB 118, the method flow continues back to block 404. If the TLB controller 235 determines at block 408 that the retry request 245 has resulted in an error, the method flow continues to block 412. At block 412, the TLB controller 235 notifies the software client 205 of the error and the software client 205 initiates error handling.

Figure 5:
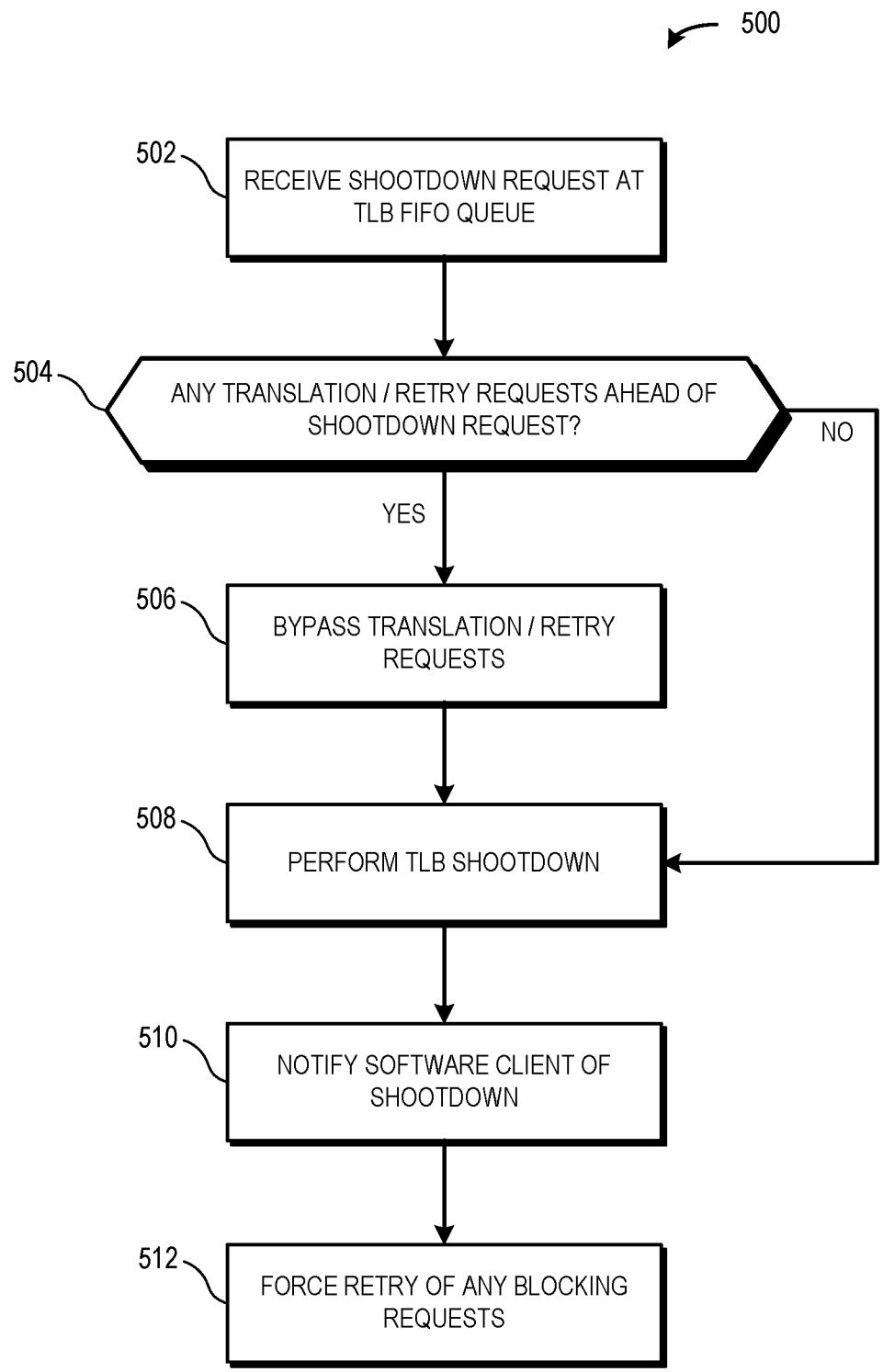
FIG. 5 is a flow diagram illustrating a method for bypassing a TLB retry request by a TLB shootdown request in accordance with some embodiments.

FIG. 5 is a flow diagram illustrating a method for bypassing a TLB retry request by a TLB shootdown request in accordance with some embodiments. Method 500 is implemented in a processing system such as the processing system 100 of FIG. 1. In some embodiments, method 500 is initiated by one or more processors in response to one or more instructions stored by a computer-readable storage medium.

In some embodiments, a page migration results in a processor core of the CPU 102 or a compute unit 110 of the parallel processor 104 modifying page table entries in the page table 126, e.g., by changing virtual address to physical address translation information for the page table 126 entries or changing a read/write property for page table 126 entries. The processor core that initiated the modification of the page table entry initiates a TLB shootdown by sending a shootdown request 308 to the TLB FIFO queue 215 to avoid inconsistencies between the page table 126 and copies of page table entries held in the TLB 118.

At block 502, the TLB FIFO queue 215 receives a shootdown request 308. At block 504, the TLB controller 235 determines if there are any translation requests 304, 306 or retry requests 302 ahead of the shootdown request 308 in the TLB FIFO queue 215. If, at block 504, the TLB controller 235 determines that there are one or more translation requests 304, 306 or retry requests 302 ahead of the shootdown request 308 in the TLB FIFO queue 215, the method flow continues to block 506.

At block 506, the TLB controller 235 allows the shootdown request 308 to bypass any translation requests 304, 306 or retry requests 302 that are ahead of the shootdown request 308 in the TLB FIFO queue 215. If, at block 504, the TLB controller 235 determines that there are no translation requests or retry requests ahead of the shootdown request 308 in the TLB FIFO queue 215, the method flow continues to block 508. At block 508, the TLB controller 235 performs the TLB shootdown requested by the shootdown request 308 by invalidating cached copies of the page table entry that is to be modified that are stored at the L0 TLB 220 and/or the L1 TLB 230 to avoid inconsistencies with the modified page table entry.

At block 508, the TLB controller 235 notifies the software client 205 of the shootdown, e.g., by sending a shootdown ACK 305. At block 512, the TLB controller 235 forces a retry of any translation requests or retry requests, such as retry request 302, translation request 304 and translation request 306, that had been blocking the shootdown request 308 at the TLB FIFO queue 215. When the retry request 302, translation request 304 and translation request 306 are processed by the TLB controller 235, they access current virtual memory address to physical memory address translations. In some embodiments, the TLB controller 235 treats the translation requests 304, 306 as retry requests after they are bypassed by the shootdown request 308.

In some embodiments, the apparatus and techniques described above are implemented in a system including one or more integrated circuit (IC) devices (also referred to as integrated circuit packages or microchips), such as the processing system described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
in response to a retry response notification generated by a translation lookaside buffer (TLB) for a first request from a software client for translation of a first virtual memory address to a first physical memory address, waiting, by a retry loop implemented within the TLB, for a programmable delay period; and
retrying, by the retry loop, the first request at the TLB independent of a command from the software client.

2. The method of claim 1, further comprising:
in response to retrying the first request resulting in a hit at the TLB, notifying the software client of the hit.

3. The method of claim 1, further comprising:
in response to retrying the first request resulting in an error at the TLB, notifying the software client of the error.

4. The method of claim 1, further comprising:
programming the programmable delay period during initialization of the software client.

5. The method of claim 1, further comprising:
in response to receiving an indication that entries of the TLB corresponding to a page of memory targeted by the first request are to be invalidated, bypassing retrying the first request at the TLB; and
notifying the software client of the indication.

6. The method of claim 5, further comprising:
retrying the first request after the entries have been invalidated.

7. The method of claim 1, further comprising:
in response to receiving a second request from the software client for translation of a second virtual memory address to a second physical memory address while retrying the first request is in progress, blocking the second request.

8. A method, comprising:
starting, by a retry loop implemented within a translation lookaside buffer (TLB), a programmable timer in response to a retry response notification generated by the TLB for a request from a software client for translation of a virtual memory address to a physical memory address; and
retrying, by the retry loop, the request at the TLB in response to the programmable timer expiring.

9. The method of claim 8, further comprising:
in response to retrying the request resulting in a hit at the TLB, notifying the software client of the hit.

10. The method of claim 8, further comprising:
in response to retrying the request resulting in an error at the TLB, notifying the software client of the error.

11. The method of claim 8, further comprising:
programming the programmable timer during initialization of the software client.

12. The method of claim 8, further comprising:
in response to receiving an indication that entries of the TLB corresponding to a page of shared memory targeted by the request are to be invalidated, bypassing retrying the request at the TLB; and
notifying the software client of the indication.

13. The method of claim 12, further comprising:
retrying the request after the entries have been invalidated.

14. A device, comprising:
a processor;
a memory; and
a translation lookaside buffer (TLB) comprising entries indicating translations of virtual memory addresses to physical memory addresses of the memory, wherein the TLB is configured to:
in response to a retry response notification at the TLB for a first request from a software client executing at the processor for translation of a first virtual memory address to a first physical memory address, wait for a programmable delay period; and
retry the first request at the TLB independent of a command from the software client.

15. The device of claim 14, wherein the TLB is further configured to:
in response to retrying the first request resulting in a hit at the TLB, notify the software client of the hit.

16. The device of claim 14, wherein the TLB is further configured to:
in response to retrying the first request resulting in an error at the TLB, notify the software client of the error.

17. The device of claim 14, wherein:
the programmable delay period is programmed during initialization of the software client.

18. The device of claim 14, wherein the TLB is further configured to:
in response to receiving an indication that entries of the TLB corresponding to a page of memory targeted by the first request are to be invalidated, bypass retrying the first request at the TLB; and
notify the software client of the indication.

19. The device of claim 18, wherein the TLB is further configured to:
retry the first request after the entries have been invalidated.

20. The device of claim 14, wherein the TLB is further configured to:
in response to receiving a second request from the software client for translation of a second virtual memory address to a second physical memory address while retrying the first request is in progress, block the second request.

* * * * *